United States Patent

Simpson et al.

[11] Patent Number: 5,986,983
[45] Date of Patent: Nov. 16, 1999

[54] MULTIPLE DEGREES OF FREEDOM ACTUATOR FOR OPTICAL RECORDING

[75] Inventors: Charles J. Simpson; Philip F. Marino, both of Rochester, N.Y.; Kurt W. Getreuer, Colorado Springs, Colo.

[73] Assignee: Eastman Kodak Company, Rochester, N.Y.

[21] Appl. No.: 08/971,875

[22] Filed: Nov. 19, 1997

[51] Int. Cl.⁶ .................................................. G11B 7/00
[52] U.S. Cl. ......................................................... 369/44.14
[58] Field of Search ............................ 369/44.12, 44.14, 369/44.15, 44.16, 44.19

[56] References Cited

U.S. PATENT DOCUMENTS

| | | |
|---|---|---|
| 4,449,213 | 5/1984 | Noborimoto et al. . |
| 4,592,037 | 5/1986 | Ohnuki . |
| 4,613,202 | 9/1986 | Kuriyama . |
| 4,669,823 | 6/1987 | Iguma et al. . |
| 4,750,164 | 6/1988 | Nose . |
| 4,767,187 | 8/1988 | Gijzen et al. . |
| 4,794,580 | 12/1988 | Ikedo et al. . |
| 4,845,699 | 7/1989 | Kawasaki et al. . |
| 5,046,820 | 9/1991 | Saekusa et al. ........................ 369/44.15 |
| 5,222,056 | 6/1993 | Tanaka .................................. 369/44.22 |
| 5,748,580 | 5/1998 | Matsui .................................. 369/44.15 |

FOREIGN PATENT DOCUMENTS 57-200949  3/1983  Japan .

Primary Examiner—Nabil Hindi
Attorney, Agent, or Firm—Pamela R. Crocker

[57] ABSTRACT

An optical actuator adapted to control the position of the actuator in at least two degrees of freedom of motion. The actuator includes a base, a moveable lens holder having a lens, a structure for connecting the lens holder to the base to support movement of the lens holder, and first and second pairs of surface-field motors, each pair of surface-field motors having first and second surface-field motors, each first and second surface-field motor including a surface-field coil and a surface-field magnetic assembly for applying forces to the lens holder to move the lens holder in at least two degrees of freedom of motion relative to the base, the surface-field coil being mounted on either the base or the lens holder, and the corresponding surface-field magnetic assembly being oppositely mounted on either the lens holder or the base to interact with the surface-field coil. Each surface-field magnetic assembly includes two pairs of opposing poles with one pair of opposing poles facing the corresponding surface-field coil, the opposing poles of each pair being separated by a pole dividing line so that the pole dividing lines of the opposing poles facing the surface-field coils of the surface-field magnetic assemblies of the first surface-field motor extend and intersect at a point above the surface-field coils, and the pole dividing lines of the opposing poles facing the surface-field coils of the surface-field magnetic assemblies of the second surface-field motor extend and intersect at a point below the surface-field coils. Currents are selectively applied to the surface-field coils so that the surface-field motors apply forces to the lens holder to control at least two degrees of freedom of motion of the lens holder relative to the base.

14 Claims, 5 Drawing Sheets

MULTIPLE DEGREES OF FREEDOM ACTUATOR FOR OPTICAL RECORDING

CROSS REFERENCE TO RELATED APPLICATIONS

The present application is related to commonly-assigned U.S. application Ser. No. 08/974,662 (Docket 76,423), filed concurrently herewith, by Marino et al., entitled, "Optical Actuator With Tensioned Suspension," the disclosure of which is herein incorporated by reference.

FIELD OF THE INVENTION

The present invention relates to optical recording actuators, and in particular, to optical recording actuators having multiple degrees of freedom of motion.

BACKGROUND OF THE INVENTION

Optical disk recording devices include an objective lens which focuses a laser light beam onto an optical disk while the disk is rotating. Both focus and tracking of optical disks must continuously be maintained while the disks are recording. Focus and tracking actuators are typically used in optical disk recording and playback devices to control the position of the objective lens relative to the rotating disk. Focus is controlled by adjusting the distance between the objective lens and the disk surface. Tracking is controlled by correcting the radial position of the objective lens so that a single data track is read or written at a time. The motions of the actuator in the focus and tracking directions are conventionally controlled by a servo system, and the forces which cause these motions are typically generated by one or more electromagnetic motors.

Alignment of the optical axis of the objective lens to the optical disk must be maintained accurately for the system to function properly. Higher data densities in optical recording require higher quality optics. Any tilt of the disk surface relative to the optical axis of the objective lens decreases the spot quality at the recording layer on the disk. The tilt of the disk surface introduces a wavefront aberration called coma. The coma deteriorates the ability to read or write marks on the disk. In addition, the disk tilt can introduce an offset in the tracking signal.

FIG. 1 shows a conventional optical actuator generally designated 10. The optical actuator 10 includes an objective lens 12, which is well known in the art to focus a light beam (not shown) onto the surface of an optical disk (not shown). The objective lens is fixed to a lens holder 14 by an adhesive or other fastening member (not shown). The optical actuator 10 further includes four spaced-apart flexures 18 to connect the lens holder 14 to a base 16. A conventional motor is shown, which includes a pair of magnets 20, which are fixed to a pair of magnetic flux yokes 22 secured to opposite sides of the base 16. The motor further includes a focus coil 24 and four tracking coils 26 which are bonded to the lens holder 14. The focus coil 24 and tracking coils 26 are positioned with the magnetic flux generated by the magnets 20 and the magnetic flux yokes 22. The focus coil 24 and tracking coils 26 provide forces which deform the flexures 18 and move the lens holder 14 in the Y and Z directions so as to maintain the focus and tracking of the laser beam (not shown) on the optical disk (not shown). In operation, current is applied to the focus coil 24 to create a magnetic field. By energizing the focus coil 24, the lens holder 14 moves in a direction which is perpendicular to the surface of the optical disk. By energizing the tracking coils 26, the lens holder 14 moves in a direction parallel to the plane of the optical disk for tracking of the optical disk during recording or reading.

Conventional prior art optical recording actuators having two degrees of freedom of motion (focus and tracking), such as shown in FIG. 1, cannot actively control tilt of the objective lens with respect to the disk and, therefore, cannot correct for the coma. The presence of coma limits the overall system performance and reduces recording quality.

SUMMARY OF THE INVENTION

Accordingly, it is an object of the present invention to provide an optical recording actuator having a lens holder that can effectively be positioned in up to four degrees of freedom of motion (focus, tracking, pitch, and roll).

This object is achieved by an optical recording actuator for recording or reading from an optical disk, the actuator being adapted to control the position of the actuator in at least two degrees of freedom of motion, comprising:

(a) a base;
(b) a moveable lens holder having a lens;
(c) means for connecting the lens holder to the base to support movement of the lens holder;
(d) first and second pairs of surface-field motors, each pair of surface-field motors having first and second surface-field motors, each first and second surface-field motor including a surface-field coil and a surface-field magnetic assembly for applying forces to the lens holder to move the lens holder in at least two degrees of freedom of motion relative to the base, the surface-field coil being mounted on either the base or the lens holder, and the corresponding surface-field magnetic assembly being oppositely mounted on either the lens holder or the base to interact with the surface-field coil;
(e) each surface-field magnetic assembly having two pairs of opposing poles with one pair of opposing poles facing the corresponding surface-field coil, the opposing poles being separated by a pole dividing line so that the pole dividing lines of the opposing poles facing the surface-field coils of the surface-field magnetic assemblies of the first pair of surface-field motors extend and intersect at a point above the surface-field coils, and the pole dividing lines of the opposing poles facing the surface-field coils of the surface-field magnetic assemblies of the second pair of surface-field motors extend and intersect at a point below the surface-field coils; and
(f) means for selectively applying currents to the surface-field coils so that the surface-field motors apply forces to the lens holder to control at least two degrees of freedom of motion of the lens holder relative to the base.

ADVANTAGES

It is an advantage of the present invention to provide an optical recording actuator which has up to four controllable degrees of freedom of motion (focus, tracking, roll, and pitch).

It is another advantage of the present invention to provide an optical recording actuator which corrects for coma caused by tilt of the disk surface relative to the optical axis of the objective lens.

BRIEF DESCRIPTION OF THE DRAWINGS

To facilitate understanding, identical reference numerals have been used, where possible, to designate elements that are common to the Figures.

DETAILED DESCRIPTION OF THE INVENTION

Figure 1:
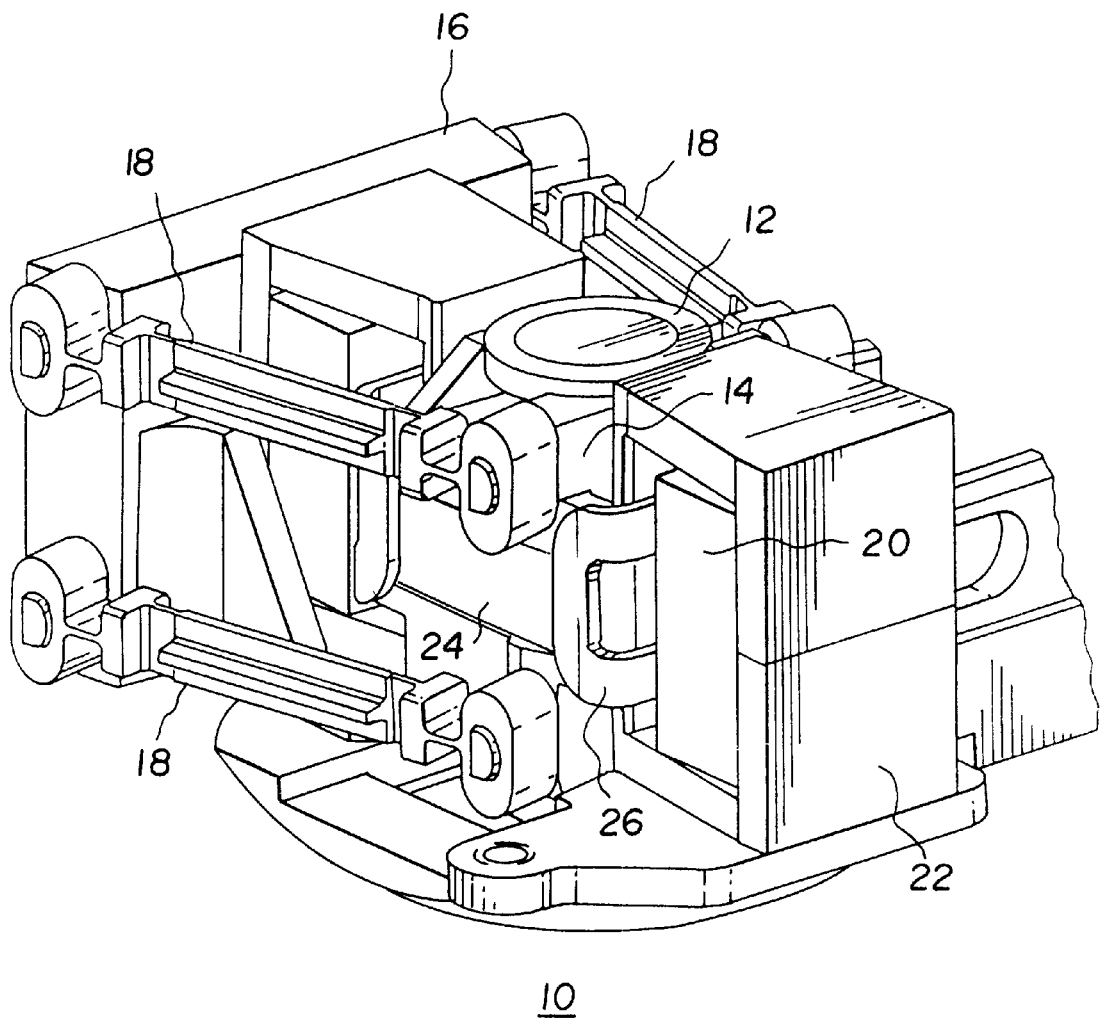
FIG. 1 is a perspective of a prior art optical actuator which provides focus and tracking control.
Figure 2:
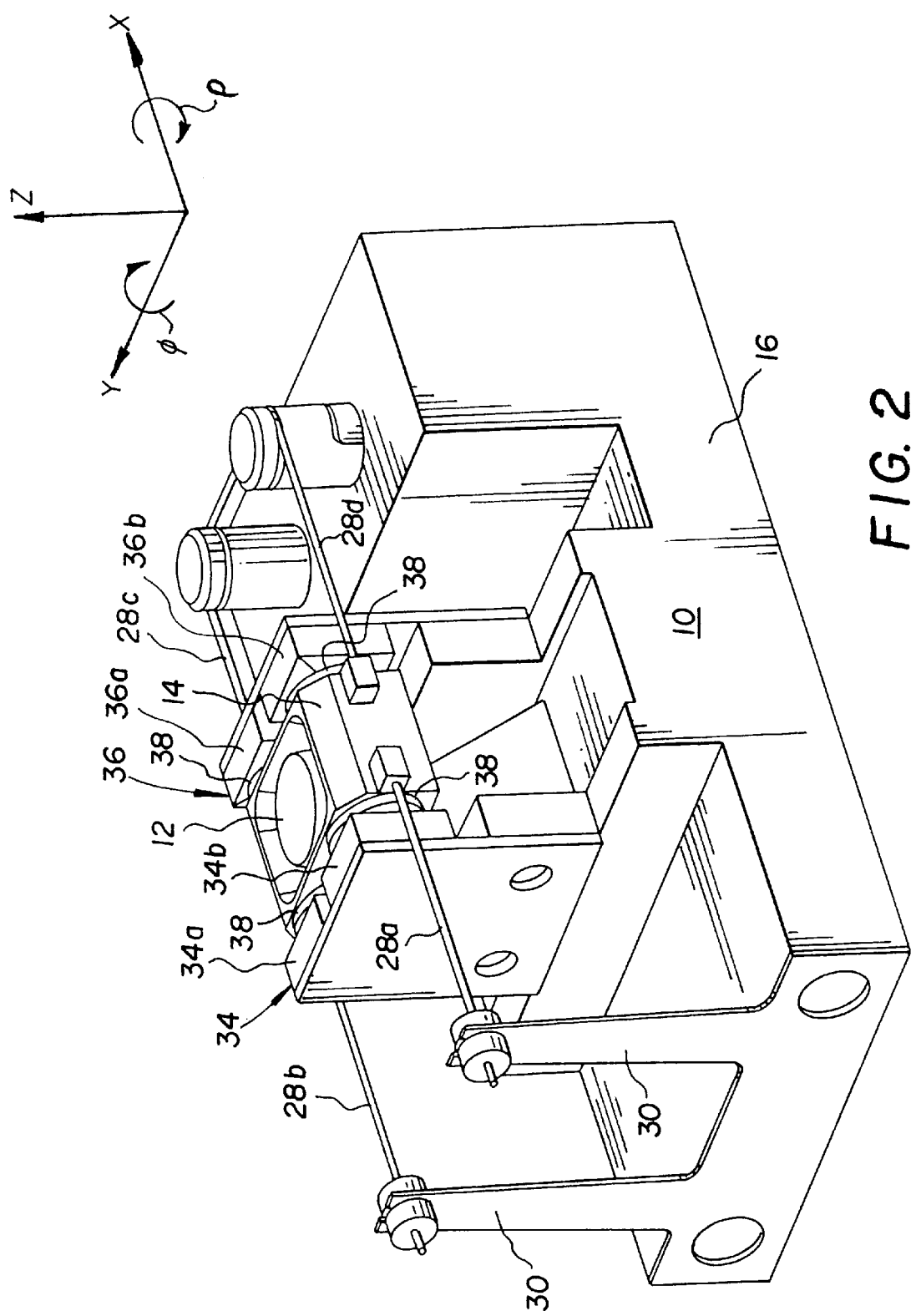
FIG. 2 is a perspective of an optical actuator in accordance with the present invention.

Referring to FIG. 2, a perspective of an optical actuator 10 in accordance with the present invention is shown. The optical actuator 10 includes a lens holder 14 for mounting an objective lens 12, as is well known in the art. The objective lens 12 is fixed to the lens holder 14 by an adhesive or other fastening structure (not shown). Preferably, the lens holder 14 is made of a molded plastic, such as VECTRA (General Electric Company). The lens holder 14 is connected to a base 16 by a connecting structure, which support movement of the lens holder 14. In a preferred embodiment, as shown in FIG. 2, the connecting structure includes four spaced-apart flexible, inextensible, coplanar connecting members 28a, 28b, 28c, and 28d to allow movement of the lens holder 14 in four degrees of freedom of motion relative to the base 16. The four degrees of freedom of motion are focus (displacement in the Z direction), tracking (displacement in the Y direction), roll (rotation p about the X axis), and pitch (rotation φ about the Y axis). A tensioning structure is connected to the lens holder 14 to apply force to the lens holder 14 in the plane of the connecting members 28a, 28b, 28c, and 28d for generating tension in the connecting members 28a, 28b, 28c, and 28d. The tensioning structure can be provided, for example, by a pair of springs 30 (as shown in FIG. 2), or by a pair of magnets (not shown). Two of the connecting members 28c and 28d are fixed at one end to the base 16 and at the other end to the lens holder 14. The other two connecting members 28a and 28b are fixed at one end to the lens holder 14 and at the other end to the pair of springs 30 which are attached to the base 16. The pair of springs 30 apply sufficient tension to each of the connecting members 28a, 28b, 28c, and 28d to support the lens holder 14. The flexible, inextensible, coplanar connecting members 28 and the tensioning means 30 are described in more detail in concurrently-filed, commonly-assigned U.S. application Ser. No. 08/974,662 (Docket 76,423), the disclosure of which is herein incorporated by reference. The connecting structure can, alternatively, be any conventional flexure arrangement in which the flexures are fixed at one end to the lens holder 14 and at the other end to the base 16. A conventional flexure arrangement can include, for example, a two flexure configuration or a four flexure configuration, and such flexures are typically manufactured of metal wire or molded plastic.

The optical actuator 10 further includes first and second pairs of surface-field motors 34 and 36. The term "surface-field motor" as used herein is defined as a motor with a multiple pole magnet and a thin coil set arranged on opposite sides of a gap having the shape of a planar, curved or angled surface. The first and second pairs of surface-field motors 34 and 36 each include first and second surface-field motors.

Each surface-field motor includes a surface-field coil 38 and a surface-field magnetic assembly 40. The terms "surface-field magnetic assembly" and "surface-field coil" refer to components configured for use in a surface-field motor.

Figure 3:
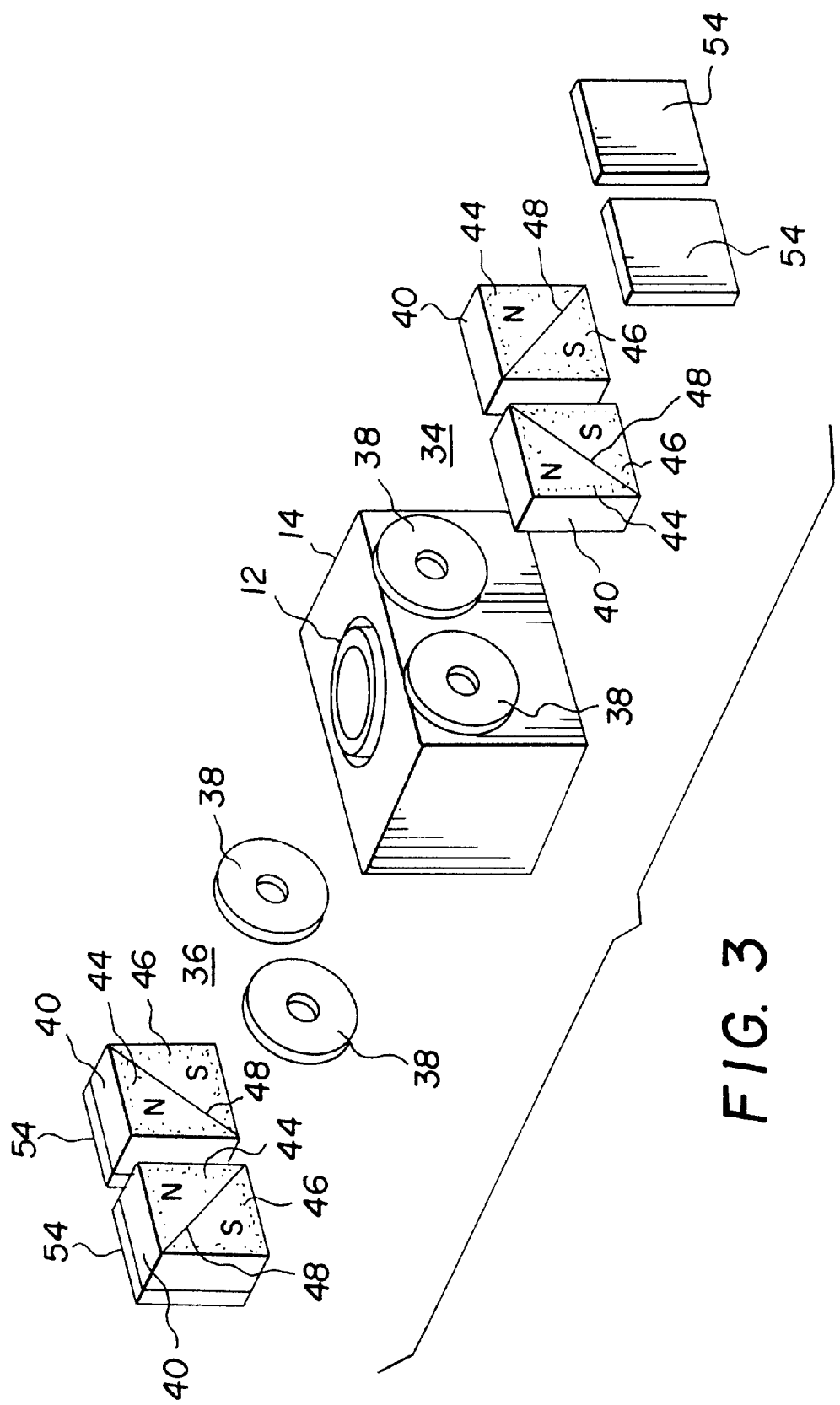
FIG. 3 is an exploded view of the actuator motors of FIG. 2.

FIG. 3 shows the first and second pairs of surface-field motors 34 and 36 in more detail. As shown in FIG. 3, each surface-field magnetic assembly 40 has two pairs of opposing poles 44 and 46 (only one pair being shown in FIG. 3) with one pair of opposing poles 44 and 46 facing the corresponding surface-field coil 38. The opposing poles 44 and 46 of each pair are separated by a pole dividing line 48. Preferably, the opposing poles 44 and 46 of each pair are symmetrical with respect to the pole dividing line 48. The surface-field magnetic assemblies 40 of each pair of surface-field motors 34 and 36 are arranged so that the pole dividing lines 48 of the pair of opposing poles 44 and 46 facing the surface-field coils 38 of the surface-field magnetic assemblies 40 of the first pair of surface-field motors 34 extend and intersect at a point 50 above the surface-field coils 38. Likewise, the pole dividing lines 48 of the pair of opposing poles 44 and 46 facing the surface-field coils 38 of the surface-field magnetic assemblies 40 of the second pair of surface-field motors 36 extend and intersect at a point 52 below the surface-field coils 38. For clarity of illustration, the intersection point 50 is shown on FIG. 4A, and the intersection point 52 is not shown intersection points 50 and 52 are both shown on FIG. 5.

Referring briefly to FIG. 2, the surface-field coils 38 are preferably mounted to the lens holder 14, and the surface-field magnetic assemblies 40 are mounted to the base 16. Alternatively, the surface-field coils 38 could be mounted to the base 16 and the surface-field magnetic assemblies 40 could be mounted to the lens holder 14. In either configuration, the surface-field coils 38 are bonded over one entire surface of the surface-field coil 38 to the lens holder 14 or the base 16. The surface-field coils 38 and the surface-field magnetic assemblies 40 are arranged so that there is a gap (for example, having a range of about 0.1 mm–1.0 mm) between the surface-field coils 38 and the corresponding surface-field magnetic assemblies 40. Optionally, magnetic flux plates 54 can be attached to the surface-field magnetic assemblies 40, or can be positioned behind the surface-field magnetic assemblies 40 to increase motor efficiency.

In accordance with the present invention, the surface-field coils 38 and the surface-field magnetic assemblies 40 are symmetrical with respect to the optical axis of the objective lens 12. Preferably, the surface-field coils 38 are flat and of equal size, and are arranged in a surface configuration which, advantageously, can be relatively thin and compact. The shape of the surface-field coils 38 is shown in FIG. 3 as being round. However, the shape of the surface-field coils 38 can be square, rectangular, oval, triangular, or any other appropriate shape to enhance the performance of the motor, as long as a surface-field arrangement is maintained. The surface-field coils 38 can be constructed using conventional wound copper wire or, due to the flattened nature of the surface-field coils 38, printed circuit coils can be used which can be fabricated by either thin film or thick film processes. Because the surface-field coils 38 are flat and are bonded to either the lens holder 14 or the base 16 over one entire surface of the surface-field coil 38, the actuator 10 of the present invention substantially eliminates resonance problems associated with prior art actuators having free-standing or unsupported coils. In addition, since all four surface-field coils 38 are substantially similar, there is no need to provide separate tracking and focus coils required in prior art actuators, thereby decreasing manufacturing costs.

Figure 4A:
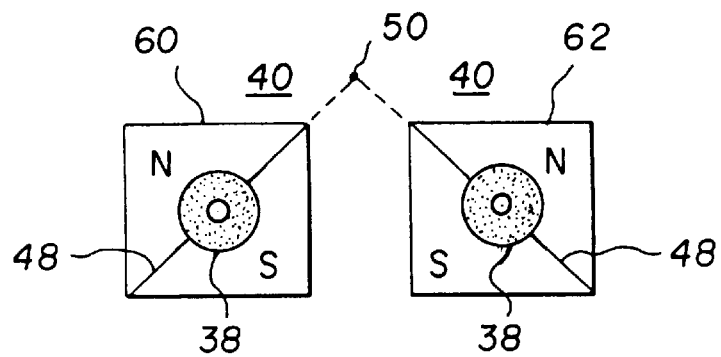
FIGS. 4A–4F are cross-sectional views of various coil and magnetic assembly configurations which can be used in accordance with the present invention.

FIGS. 4A–4F show various alternative surface-field coil and surface-field magnetic assembly configurations which can be used in accordance with the present invention. As shown in FIG. 4A, the surface-field magnetic assemblies 40 of each pair of surface-field motors 34 and 36 (see FIG. 3), in combination, include two magnetic members 60 and 62 which are each magnetized through the thickness of the material. Each magnetic member 60 and 62 includes triangular cross-sections. Each triangular cross-section has opposing pole portions (north and south) which are separated by the pole dividing line 48.

Figure 4B:
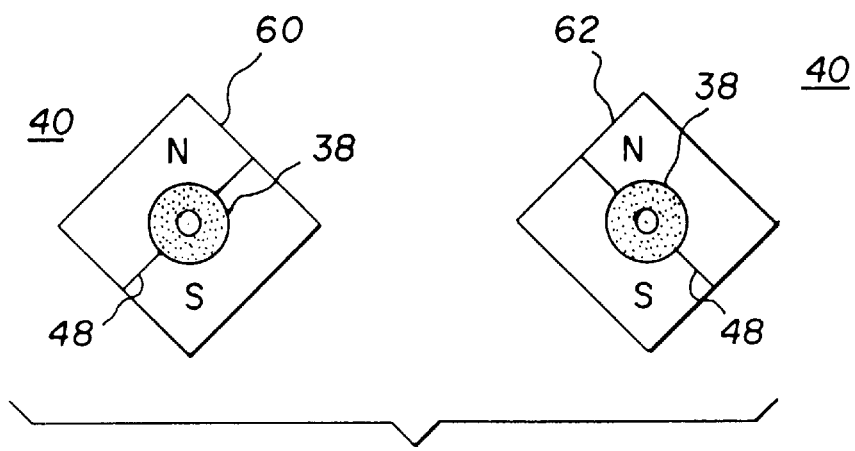

In an alternative configuration, as shown in FIG. 4B, each magnetic member 60 and 62 of the surface-field magnetic assemblies 40 includes rectangular cross-sections with opposing pole portions (north and south) separated by the pole dividing line 48.

Figure 4C:
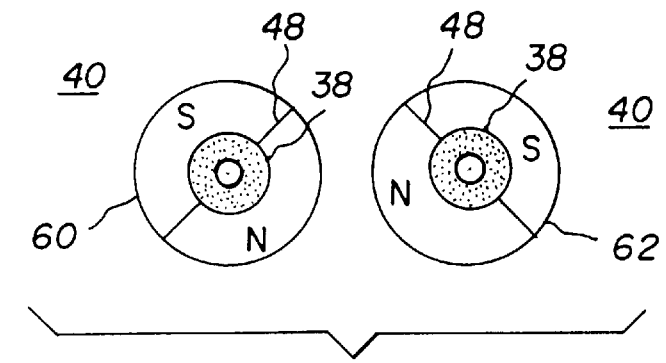

FIG. 4C shows each magnetic member 60 and 62 of the surface-field magnetic assemblies 40 including semi-circular cross-sections with opposing pole portions (north and south) separated by the pole dividing line 48.

Figure 4D:
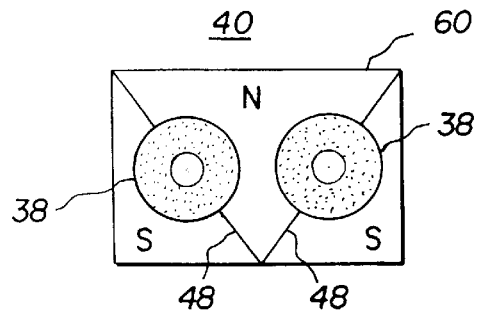
Figure 4E:
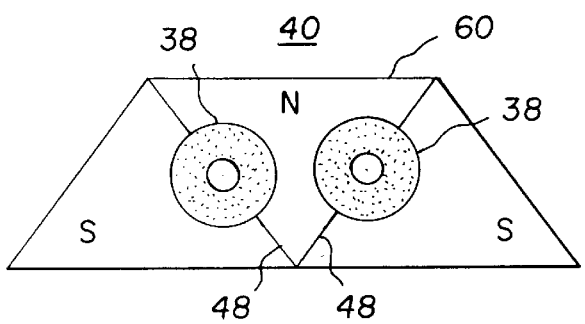

FIGS. 4D and 4E show the surface-field magnetic assemblies 40 as having, in combination, one magnetic member 60 with three portions of triangular cross-sections which are arranged so that the portions define the pole dividing lines 48.

Figure 4F:
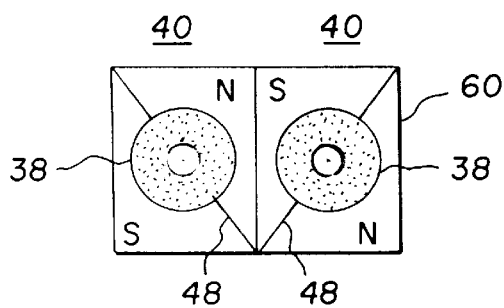

FIG. 4F shows the surface-field magnetic assemblies 40, in combination, as having one magnetic member 60 with four portions of triangular cross-sections which are arranged so that the portions define the pole dividing lines 48. It would be understood by those skilled in the art that additional surface-field coil and surface-field magnetic assembly configurations other than those shown in FIGS. 4A–4F could be used in accordance with the present invention.

As previously mentioned, the position of the lens holder 14 is controllable in up to four degrees of freedom of motion relative to the actuator base 16 (focus, tracking, roll, and pitch). The motion of the lens holder 14 can be controlled by conventional focus, tracking, and tilt sensors (not shown) and a conventional servo system (not shown), which are well known in the art. The sensors produce focus error, tracking error, and tilt error signals which are used to calculate the desired motion of the lens holder in the four degrees of freedom relative to the base, and to provide servo commands to a conventional servo system. The servo system produces command signals which represent the desired motion in the four degrees of freedom. These command signals are mathematically converted using a matrix multiplication into signals which are applied to coil current amplifiers (not shown). The coil current amplifiers control the surface-field coils 38. See commonly-assigned U.S. application Ser. No. 08/660,568, filed Jun. 7, 1996, by Philip Marino, et al, entitled POSITION SENSING FOR AN OPTICAL RECORDING ACTUATOR and U.S. application Ser. No. 08/694,974 filed Aug. 9, 1996 by Philip Marino, et al, entitled MAGNETICALLY SUSPENDED OPTICAL RECORDING ACTUATOR, the disclosures of which are herein incorporated by reference, for examples of a position sensing system and a servo system which can be used in accordance with the present invention. Alternatively, conventional focus and tracking error signals which are derived from a light beam reflected off the optical disk surface could also be used to provide position sensing information.

Figure 5:
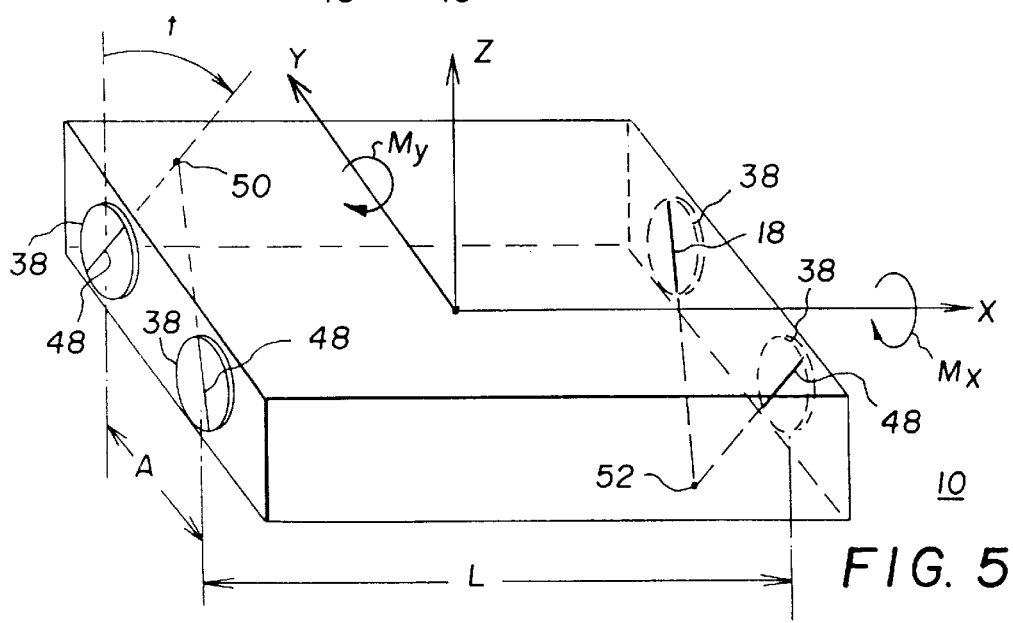
FIG. 5 is a perspective of the optical actuator of FIG. 2 illustrating the dimensions used to determine the currents applied to the surface-field coils.

Referring to FIG. 5, a perspective of the optical actuator 10 is shown illustrating the dimensions used to determine the currents applied to the surface-field coils 38. In accordance with the present invention, each of the four surface-field coils 38 is selectively supplied with electrical current by the coil current amplifier (not shown) to produce force on the lens holder 14. The currents supplied to each of the four surface-field coils 38 produce four independent forces which, together, control the position of the lens holder 14 in the four controlled degrees of freedom of motion relative to the base 16. In accordance with the present invention, the currents to be supplied to the surface-field coils 38 are determined by the following equations:

$$\begin{Bmatrix} I_1 \\ I_2 \\ I_3 \\ I_4 \end{Bmatrix} = [C] \times \begin{Bmatrix} F_z \\ F_y \\ M_x \\ M_y \end{Bmatrix} \qquad (1)$$

$$C = \begin{bmatrix} \frac{1}{(4(K_m \cos(t)))} & \frac{1}{(4(K_m \sin(t)))} & \frac{-1}{(2(K_m \cos(t)A)))} & \frac{1}{(2(K_m \cos(t)L)))} \\ \frac{1}{(4(K_m \cos(t)))} & \frac{-1}{(4(K_m \sin(t)))} & \frac{1}{(2(K_m \cos(t)A)))} & \frac{1}{(2(K_m \cos(t)L)))} \\ \frac{1}{(4(K_m \cos(t)))} & \frac{-1}{(4(K_m \sin(t)))} & \frac{-1}{(2(K_m \cos(t)A)))} & \frac{-1}{(2(K_m \cos(t)L)))} \\ \frac{1}{(4(K_m \cos(t)))} & \frac{1}{(4(K_m \sin(t)))} & \frac{1}{(2(K_m \cos(t)A)))} & \frac{-1}{(2(K_m \cos(t)L)))} \end{bmatrix} \qquad (2)$$

wherein:

C is a control matrix;

$F_Z$ is focus force;

$F_Y$ is tracking force;

$M_X$ is roll moment;

$M_Y$ is pitch moment;

$I_1$ and $I_2$ are the currents applied to the surface-field coils 38 associated with the first pair of surface-field motors 34;

$I_3$ and $I_4$ are the currents applied to the surface-field coils 38 associated with the second pair of surface-field motors 36;

$K_M$ is a motor force constant;

t is the angle between the vertical axis and the pole dividing line of each surface-field coil 38;

A is the distance between the centers of the surface-field coils 38 of each pair of surface-field motors 34 and 36; and L is the distance between the centers of the surface-field coils 38 of the first pair of surface-field motors 34 and the centers of the surface-field coils 38 of the second pair of surface-field motors 36.

The required focus force $F_z$, tracking force $F_y$, roll moment $M_x$, and pitch moment $M_y$ are well known in the art and are calculated by the servo system based on information from the position sensors (focus, tracking, and tilt). When the calculated currents $I_1$, $I_2$, $I_3$, and $I_4$ are applied to the four surface-field coils 38, forces are produced between the surface-field coils 38 and the respective surface-field magnetic assemblies 40 and 42 so that the first and second pairs of surface-field motors 34 and 36 apply forces to the lens holder 14 to control the lens holder 14 in the four degrees of freedom of motion relative to the base 16. The solutions to equations (1) and (2) above are for providing currents to four surface-field coils 38 to control the position of the lens holder 14 in four degrees of freedom of motion relative to the base 16. By controlling the actuator 10 in the four degrees of freedom of motion in accordance with the present invention, the actuator 10 can correct for coma caused by tilt of the optical disk surface relative to the optical axis of the objective lens.

In the calculation of the currents using equations (1) and (2) in accordance with the present invention, it is assumed that the actuator 10 is symmetric about both the X-axis and the Y axis, and that the first and second pairs of surface-field motors 34 and 36 are substantially similar. It would be understood by those skilled in the art that the control matrix (equation (2)) would have to be adjusted if the actuator 10 were not symmetric, or if the first and second pairs of surface-field motors 34 and 36 were not similar. Further, it would be understood by those skilled in the art that the currents supplied to the surface-field coils 38 can be selected so that the first and second pairs of surface-field motors 34 and 36 apply forces to the lens holder 14 to control only two degrees of freedom of motion (focus and tracking) of the lens holder 14 relative to the base 16, or three degrees of freedom of motion (focus, tracking, and either roll or pitch), in which case the control matrix, C, would have to be adjusted accordingly.

The invention has been described in detail with particular reference to certain preferred embodiments thereof, but it will be understood that variations and modifications can be effected within the spirit and scope of the invention.

PARTS LIST 10 optical actuator
12 objective lens
14 lens holder
16 base
18 flexure
20 magnet
22 magnetic flux yoke
24 focus coil
26 tracking coil
28a, 28b, 28c, 28d connecting member
30 springs
34 surface-field motor pair
36 surface-field motor pair
38 surface-field coil
40 surface-field magnetic assembly
44 magnetic pole
46 magnetic pole
48 pole dividing line
50 intersection point
52 intersection point
54 magnetic flux plate
60 member
62 member
C control matrix
$F_Z$ focus force
$F_Y$ tracking force
$M_X$ roll moment
$M_Y$ pitch moment
$I_1$, $I_2$, $I_3$, $I_4$ current
$K_M$ motor force constant
t angle between the vertical axis and the pole dividing line of each surface-field coil
A distance between the centers of the surface-field coils of each pair of surface-field motors
L distance between the centers of the surface-field coils of the first pair of surface-field motors and the centers of the surface-field coils of the second pair of surface-field motors

What is claimed is:

1. An optical actuator for recording or reading from an optical disk, the actuator being adapted to control the position of the actuator in at least two degrees of freedom of motion, comprising:

(a) a base;

(b) a moveable lens holder having a lens;

(c) means for connecting the lens holder to the base to support movement of the lens holder;

(d) first and second pairs of surface-field motors, each pair of surface-field motors having first and second surface-field motors, each first and second surface-field motor including a surface-field coil and a surface-field magnetic assembly for applying forces to the lens holder to move the lens holder in at least two degrees of freedom of motion relative to the base, the surface-field coil being mounted on either the base or the lens holder, and the corresponding surface-field magnetic assembly being oppositely mounted on either the lens holder or the base to interact with the surface-field coil;

(e) each surface-field magnetic assembly having two pairs of opposing poles with one pair of opposing poles facing the corresponding surface-field coil, the opposing poles being separated by a pole dividing line so that the pole dividing lines of the opposing poles facing the surface-field coils of the surface-field magnetic assemblies of the first pair of surface-field motors extend and intersect at a point above the surface-field coils, and the pole dividing lines of the opposing poles facing the surface-field coils of the surface-field magnetic assemblies of the second pair of surface-field motors extend and intersect at a point below the surface-field coils; and (f) means for selectively applying currents to the surface-field coils so that the surface-field motors apply forces to the lens holder to control at least two degrees of freedom of motion of the lens holder relative to the base.

2. The optical actuator of claim 1 wherein the opposing poles of each surface-field magnetic assembly are symmetrical with respect to the pole dividing line.

3. The optical actuator of claim 1 wherein the position of the lens holder is controlled in four degrees of freedom of motion relative to base.

4. The optical actuator of claim 3 wherein the currents applied to the surface-field coils to control the position of the lens holder in the four degrees of freedom of motion are determined by the following equations:

$$\begin{Bmatrix} I_1 \\ I_2 \\ I_3 \\ I_4 \end{Bmatrix} = [C] \times \begin{Bmatrix} F_z \\ F_y \\ M_x \\ M_y \end{Bmatrix}$$

$$C = \begin{bmatrix} \frac{1}{(4(K_m\cos(t)))} & \frac{1}{(4(K_m\sin(t)))} & \frac{-1}{(2(K_m(\cos(t)A)))} & \frac{1}{(2(K_m(\cos(t)L)))} \\ \frac{1}{(4(K_m\cos(t)))} & \frac{-1}{(4(K_m\sin(t)))} & \frac{1}{(2(K_m(\cos(t)A)))} & \frac{1}{(2(K_m(\cos(t)L)))} \\ \frac{1}{(4(K_m\cos(t)))} & \frac{-1}{(4(K_m\sin(t)))} & \frac{-1}{(2(K_m(\cos(t)A)))} & \frac{-1}{(2(K_m(\cos(t)L)))} \\ \frac{1}{(4(K_m\cos(t)))} & \frac{1}{(4(K_m\sin(t)))} & \frac{1}{(2(K_m(\cos(t)A)))} & \frac{-1}{(2(K_m(\cos(t)L)))} \end{bmatrix}$$

wherein:

C is a control matrix;

$F_Z$ is focus force;

$F_Y$ is tracking force;

$M_X$ is roll moment;

$M_Y$ is pitch moment;

$I_1$, and $I_2$ are the currents applied to the surface-field coils associated with the first pair of surface-field motors;

$I_3$ and $I_4$ are the currents applied to the surface-field coils associated with the second pair of surface-field motors;

$K_M$ is a motor force constant;

t is the angle between the vertical axis and the pole dividing line of each surface-field coil;

A is the distance between the centers of the surface-field coils of each pair of surface-field motors; and L is the distance between the centers of the surface-field coils of the first pair of surface-field motors and the centers of the surface-field coils of the second pair of surface-field motors.

5. The optical actuator of claim 1 wherein the connecting means includes:

(i) first and second pairs of spaced-apart flexible, inextensible, coplanar connecting members, each connecting member of the first pair having first and second ends with the first end being fixed to the lens holder and the second end being fixed to the base, and each connecting member of the second pair having first and second ends with the first end being fixed to the lens holder; and (ii) a pair of springs, each spring being fixed to the second end of each connecting member of the second pair of connecting members for applying a force to the lens holder in the plane of the connecting members to generate tension in the connecting members.

6. The optical actuator of claim 1 wherein the connecting means includes:

(i) first and second pairs of spaced-apart flexible, inextensible, coplanar connecting members, each connecting member of the first pair having first and second ends with the first end being fixed to the lens holder and the second end being fixed to the base, and each connecting member of the second pair having first and second ends with the first end being fixed to the lens holder; and (ii) a pair of magnets, each magnet being fixed to the second end of each connecting member of the second pair of connecting members for applying a force to the lens holder in the plane of the connecting members to generate tension in the connecting members.

7. The optical actuator of claim 1 wherein the connecting means are four spaced-apart flexures.

8. The optical actuator of claim 1 wherein the surface-field coils are mounted on the lens holder and the magnets are mounted on the base.

9. The optical actuator of claim 1 wherein the surface-field coils are mounted on the base and the magnets are mounted on the lens holder.

10. The optical actuator of claim 1 wherein the surface-field magnetic assemblies of each pair of surface-field motors include in combination two magnetic members, each magnetic member having triangular cross-sections and having opposing pole portions which are separated by the pole dividing line.

11. The optical actuator of claim 1 wherein the surface-field magnetic assemblies of each pair of surface-field motors in combination include two magnetic members, each magnetic member having rectangular cross-sections and having opposing pole portions which are separated by the pole dividing line.

12. The optical actuator of claim 1 wherein the surface-field magnetic assemblies of each pair of surface-field motors in combination include two magnetic members, each magnetic member having semi-circular cross-sections and having opposing pole portions which are separated by the pole dividing line.

13. The optical actuator of claim 1 wherein the surface-field magnetic assemblies of each pair of surface-field motors in combination include one magnetic member having at least three portions of triangular cross-sections arranged so that the portions define the pole dividing lines.

14. The optical actuator of claim 1 wherein each surface-field magnetic assembly further includes a magnetic flux plate.

* * * * *